No. 722,751. PATENTED MAR. 17, 1903.
L. V. RATHMELL.
NUT LOCK.
APPLICATION FILED OCT. 4, 1902.

NO MODEL.

WITNESSES:
Thos. D. Morgan
A. L. Phelps

INVENTOR
Leonard V. Rathmell
BY
C. C. Shepherd
ATTORNEYS

THE NORRIS PETERS CO., PHOTO-LITHO., WASHINGTON, D. C.

UNITED STATES PATENT OFFICE.

LEONARD V. RATHMELL, OF COLUMBUS, OHIO.

NUT-LOCK.

SPECIFICATION forming part of Letters Patent No. 722,751, dated March 17, 1903.

Application filed October 4, 1902. Serial No. 125,875. (No model.)

*To all whom it may concern:*

Be it known that I, LEONARD V. RATHMELL, a citizen of the United States, residing at Columbus, in the county of Franklin and State of Ohio, have invented a certain new and useful Improvement in Nut-Locks, of which the following is a specification.

My invention relates to the improvement of nut-locks; and the objects of my invention are to provide a nut-lock of improved construction which will obviate the tendency of a nut working off a bolt through jar or vibration of the parts with which the bolt is connected and to produce certain improvements in details of construction, which will be more fully pointed out hereinafter. These objects I accomplish in the manner illustrated in the accompanying drawings, in which—

Figure 1:
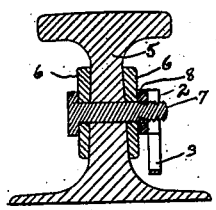
Figure 2:
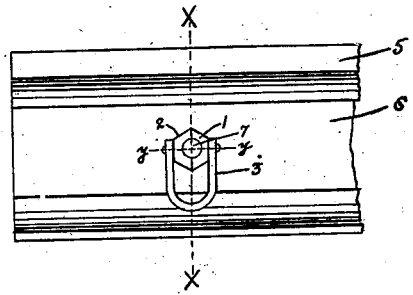
Figure 3:
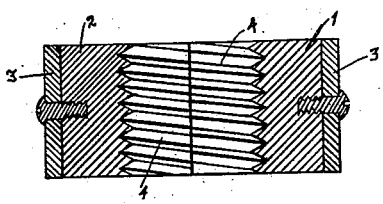
Figure 4:
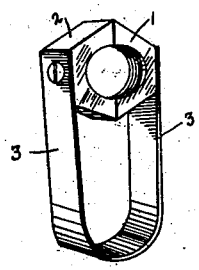

Figure 1 is a transverse section of a railway-track rail, taken on line $x\,x$ of Fig. 2. Fig. 2 is a side elevation of a portion of a track-rail, showing my improved nut-lock in use thereon. Fig. 3 is an enlarged sectional view of my improved nut-lock on line $y\,y$ of Fig. 2, and Fig. 4 is a view in perspective of said nut-lock.

Similar numerals refer to similar parts throughout the several views.

In carrying out my invention I provide an internally-threaded nut formed in two equal-sized sections, which are indicated at 1 and 2, these sections when joined forming a complete nut. 3 represents a yoke of suitable spring metal, this yoke having its upper end portion connected, respectively, with the outer sides of the nut-sections 1 and 2. The tension of the arms of the spring-yoke 3 is such as to normally retain the severed portions of the sectional nut in contact with each other, resulting in the formation of a complete nut-body. In producing the internal threads of the nut-sections 1 and 2 the threads of one section are so arranged or formed as to permit the thread depressions to register with the thread elevations of the other section when the ends of both sections are on the same level, this construction being illustrated more clearly in Fig. 3 of the drawings.

In Figs. 1 and 2 of the drawings I have illustrated my improved nut-lock as used in connection with a bolt and nut of a railway-track rail, and in these views 5 represents a track-rail; 6, the fish-plates; 7, the bolt which passes through the web of said rail and fish-plates, and 8 the usual bolt-nut. These parts having been assembled in the usual manner, the nut formed by the connected sections 1 and 2 is screwed onto the outer end portion of the bolt, with the result that as the threads of said bolt enter the nut they first engage and are forced to travel from the threads of one nut-section to the other, the threads of said sections thus being forced into proper register, but forcing the sections out of alinement. In thus effecting or forcing an engagement of the threads of the bolt with the threads of said nut-sections it is obvious that a slight movement of the parallel arms of the yoke in the direction of the length of the bolt will be produced, thus placing said arms under sufficient tension to produce such frictional resistance between the threads of the bolt and the threads of the nut as to insure the holding of said sectional nut firmly in place on the bolt.

From this construction and operation it will readily be understood that the outer sectional nut will serve to prevent an outward movement of the usual inner nut 8, thus insuring the retention of the latter on the bolt and against the fish-plate or other body in connection with which the bolt is used.

In case of difficulty in removing the outer locking-nut it is obvious that the arms of the yoke may by a suitable instrument be forced outward, thus releasing the clamping action of the nut-sections on the bolt and permitting of said sectional nut being readily removed.

Having now fully described my invention, what I claim, and desire to secure by Letters Patent, is—

In a nut-lock, the combination with the nut formed in two sections, each of said sections having its inner surface threaded, of a metallic yoke 3 having its ends secured to the outer sides of said nut-sections and normally retaining said sections in contact one with the other, the threads of one of said sections being normally out of register with the other, substantially as specified.

LEONARD V. RATHMELL.

In presence of—
C. C. SHEPHERD,
A. L. PHELPS.